US007592083B2

(12) United States Patent
Meltser et al.

(10) Patent No.: US 7,592,083 B2
(45) Date of Patent: Sep. 22, 2009

(54) INTEGRATED AIR SUPPLY WITH HUMIDIFICATION CONTROL FOR FUEL CELL POWER SYSTEMS

(75) Inventors: Mark A. Meltser, Pittsford, NY (US); Yousef M. Jarrah, Tucson, AZ (US); Ronald L. James, North Chili, NY (US); Christian König, Dreieich (DE); John B. Ruhl, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 714 days.

(21) Appl. No.: 11/245,970

(22) Filed: Oct. 7, 2005

(65) Prior Publication Data
US 2007/0082242 A1    Apr. 12, 2007

(51) Int. Cl.
*H01M 8/04* (2006.01)
*H01M 8/00* (2006.01)
*H01M 8/10* (2006.01)

(52) U.S. Cl. .............................. 429/26; 429/12; 429/22; 429/24; 429/25; 429/30

(58) Field of Classification Search ....................... None
See application file for complete search history.

(56) References Cited

U.S. PATENT DOCUMENTS 5,856,034 A * 1/1999 Huppmann et al. ........... 429/17
6,554,261 B2 * 4/2003 Katagiri et al. ............. 261/154
6,656,620 B2 * 12/2003 Katagiri et al. ............... 429/26
6,720,098 B2 * 4/2004 Raiser .......................... 429/13
6,783,881 B2 * 8/2004 Stenersen et al. ............. 429/34
7,156,379 B2 * 1/2007 Tanihara et al. ............. 261/102
2002/0004152 A1 * 1/2002 Clawson et al. ............... 429/17
2004/0175310 A1 * 9/2004 Feaviour et al. ............. 422/211

FOREIGN PATENT DOCUMENTS

JP          07071795 A  *  3/1995

OTHER PUBLICATIONS

IPDL JPO machine translation of JP07071795A published Mar. 17, 2995, retrieved on Dec. 12, 2008.*

* cited by examiner

*Primary Examiner*—Dah-Wei D Yuan
*Assistant Examiner*—Katherine Turner
(74) *Attorney, Agent, or Firm*—Dinsmore & Shohl LLP

(57) ABSTRACT

A fluid delivery device for an electrochemical conversion assembly. In one embodiment, the electrochemical conversion assembly is a fuel cell system. The device includes one or more fluid-manipulating components combined into a housing to minimize weight, size and complexity. In one form, the device may include a compressor, heat exchanger and a water vapor transfer unit, at least the latter two of which are located within a chamber defined by the housing. A controller can be used to monitor and selectively vary the extent to which at least one of these components modifies properties a fluid (such as air) that can be used as a reactant in the electrochemical conversion assembly. In a particular form, the heat exchanger and water vapor transfer unit can cooperate to promote the hydration of the reactant.

21 Claims, 7 Drawing Sheets

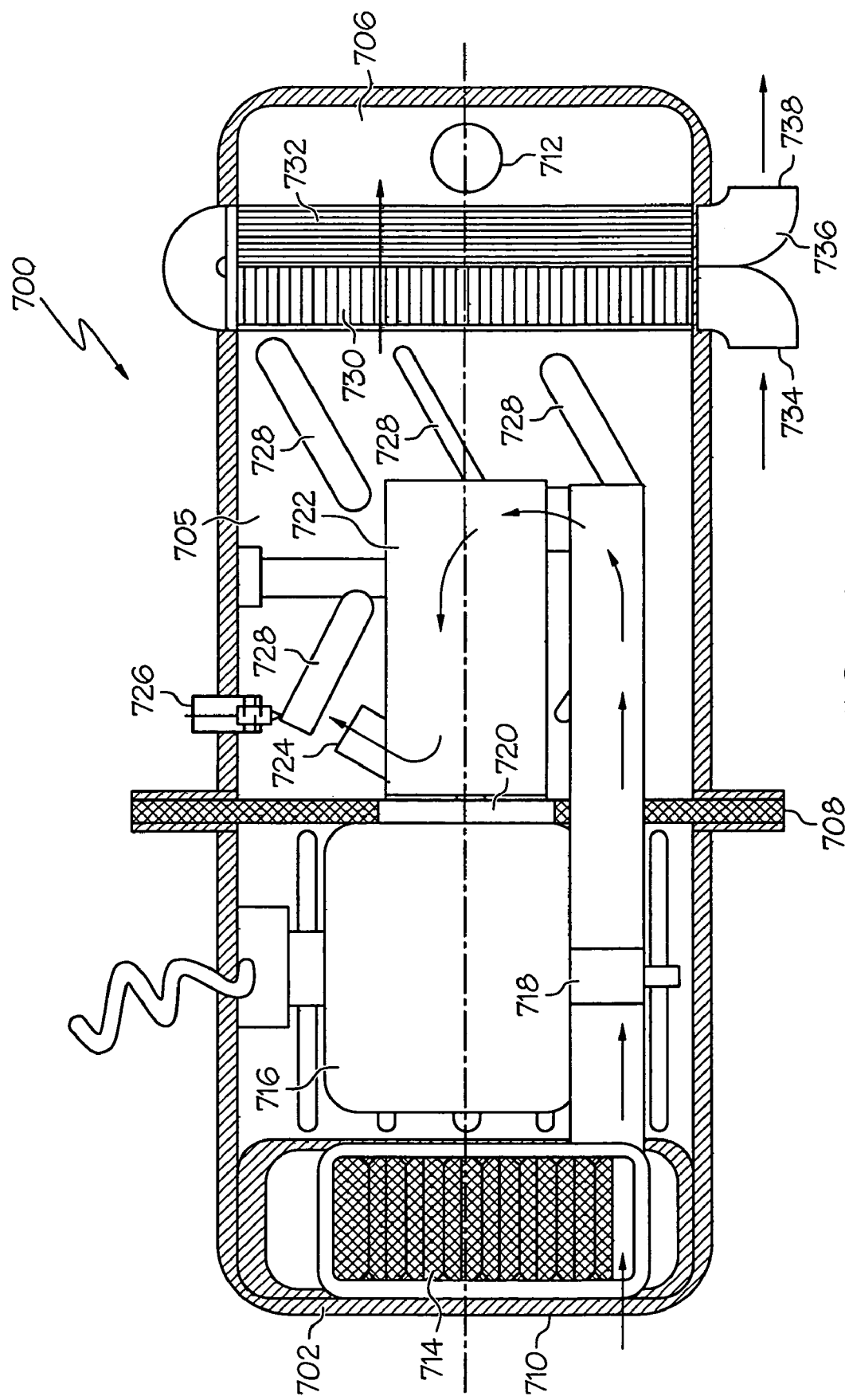

INTEGRATED AIR SUPPLY WITH HUMIDIFICATION CONTROL FOR FUEL CELL POWER SYSTEMS

BACKGROUND OF THE INVENTION

The present invention relates generally to manipulating airflow for use as a reactant in a fuel cell system, and more particularly to integrating air supply system components in such a way as to reduce the size, weight and complexity associated with such airflow manipulation.

While conventional power source devices (such as internal combustion engines, including piston and gas turbine-based platforms) are well-known as ways to produce, among other things, motive, heat and electric power, recent concerns about the effects they and their fuel sources have on the environment have led to the development of alternative means of producing such power. The interest in fuel cells is in response to these and other concerns. One form of fuel cell, called the proton exchange membrane (PEM) fuel cell, has shown particular promise for vehicular and related mobile applications, using hydrogen and oxygen as the primary reactants to produce electricity with water vapor as a non-polluting reaction byproduct. A typical PEM construction includes a porous anode and cathode with a solid polymer electrolyte membrane spaced between them. Catalysts, typically in the form of a noble metal such as platinum, are placed at the anode and cathode. In PEM fuel cells, hydrogen or a hydrogen-rich gas is supplied to the anode, where a catalytic reaction between it and the platinum or related catalyst generates protons that can travel through the electrolyte to react with the ionized oxygen at the cathode. The ionization process produces electric current that can supply, among other things, a motor or related motive power device, while the hydrogen and oxygen reaction results in the formation of water at the cathode.

Balanced water levels are required in the PEM fuel cell to ensure proper operation. For example, it is important to avoid having too much water in the fuel cell, which can result in the blockage of the porous anode and cathode, thereby preventing the flow of reactants. Contrarily, too little hydration limits electrical conductivity of the membrane. Exacerbating the difficulty in maintaining a balance in water level is that there are numerous conflicting reactions taking place in a fuel cell that are simultaneously increasing and decreasing its hydration levels. In addition to the formation of water or water vapor at the cathode as discussed above, water can be dragged from the anode and into the cathode by the ionized protons (i.e., hydrogen ions) moving from the anode. This phenomenon, known as electro-osmotic drag, significantly contributes to the removal of water molecules from the anode. Other mechanisms may also be prevalent, including diffusion of water molecules from the cathode to the anode across the membrane, the circulation of hydrogen adjacent the anode to function as an additional water removal source and the removal of water from an oxygen-depleted portion of the cathode. Furthermore, many of these effects are localized such that even if global levels of hydration are maintained in the fuel cell, there is no guarantee that local water balance is maintained. In addition, since typical PEM fuel cells operate at temperatures that are conducive for the evaporation of the resident water and a subsequent drying out of the solid polymer electrolyte membrane, it would be desirable to maintain control over PEM fuel cell temperatures as a way to avoid membrane dehydration.

The manipulation of numerous air properties, including pressure, temperature, relative humidity and mass flow rates, can be used to maintain the desired hydration levels in the fuel cell. One potential method of ensuring adequate levels of hydration throughout the fuel cell includes humidifying one or both of the reactants before they enter the fuel cell. For example, the water produced at the cathode can be used, with appropriate humidification devices, to reduce the likelihood of anode or membrane dehydration. External sources of humidity control (either addition or removal, depending on the need) may also be used. Other approaches employing a combination of the above-mentioned multiple factors (for example, the simultaneous achievement of humidity, pressure, mass flow and temperature levels) to achieve appropriate air conditions may also be used. Of course, the use of humidification, temperature, pressure and mass flow control devices necessitates additional fuel cell system weight, size and complexity (in, for example, the form of pumps coupled to intricate valve networks tied together with precision control mechanisms), as well as reductions in fuel cell output or efficiency in situations where such componentry requires a source of power to operate. Such disadvantages are especially troublesome for vehicle-based fuel cell applications, as the often redundant componentry would take up precious vehicle space otherwise used for passenger, comfort or safety features.

Accordingly, there exists a need for a PEM fuel cell system design and mode of operation that facilitate manipulation of one or more airflow properties without having to resort to approaches that require significant increases in system weight, redundancy, volume or complexity.

BRIEF SUMMARY OF THE INVENTION

These needs are met by the present invention, wherein a fuel cell system and a method of operating the system that incorporates the features discussed below is disclosed. In accordance with a first aspect of the present invention, a device including an electrochemical conversion assembly, an oxidant delivery assembly and a controller is disclosed. The electrochemical conversion assembly is configured to combine an oxidant and a reductant, while the oxidant delivery assembly is fluidly coupled to the electrochemical conversion assembly. The controller is configured to operate the oxidant delivery assembly, which includes a compressor, heat exchanger, water vapor transfer unit and housing. The oxidant delivery assembly can be used to manipulate at least one property of the oxidant delivered from an oxidant source to make the oxidant more suitable for use in the electrochemical conversion assembly. The oxidant delivery assembly's housing defines a chamber therein. The compressor can be used to pressurize the chamber with oxidant from the oxidant source, while the heat exchanger is positioned within the chamber and can be used to transfer heat from oxidant within the chamber to an exhaust fluid produced by the electrochemical conversion assembly. The water vapor transfer unit is positioned within the chamber and can be used to transfer water vapor from the aforementioned exhaust fluid to the pressurized oxidant in the chamber. It will be appreciated that the one or more elements positioned within the housing may share exterior surfaces with the housing, or even define exterior housing surfaces; the intent is to have a common housing that is able to provide simple packaging for the disparate components to minimize space, component redundancy and concomitant device complexity. In addition, by utilizing a common housing, pressure losses to the oxidant being conveyed to the electrochemical conversion assembly can be minimized, as losses associated with narrow, individual or similarly dedicated conduit can be reduced. In the present context, terms such as "oxidant source" and its variants are to be understood broadly, encompassing any device, container or environment (including the ambient environment) configured to provide an oxidant-bearing fluid, such as air, oxygen or related compound, mixture or the like.

In one optional form, the electrochemical conversion assembly is a fuel cell, where a particular form may be a PEM fuel cell. Specific fuel cell configurations may include an anode, cathode and membrane disposed between the anode and cathode. To convey reactants, the fuel cell may also include an anode flowpath configured to couple the anode to a fuel source, and a cathode flowpath fluidly coupled to the oxidant delivery assembly. The cathode flowpath, which defines conduit or related fluid-carrying means, includes a cathode inlet and a cathode outlet. The inlet of the cathode flowpath is used to convey oxidant (such as air) into the cathode for reaction with an appropriate reductant (such as hydrogen). The previously-discussed exhaust fluid (also called reactant byproduct) that forms upon completion of the reaction at the cathode is conveyed away from the cathode through the outlet of the cathode flowpath such that the reactant byproduct formed in the fuel cell can flow to the water vapor transfer unit or related humidity control device. There, the reactant byproduct may, with optional heat addition from the heat exchanger, be used to increase the humidity of the oxidant being fed to the fuel cell. While it has been mentioned that one type of fuel cell that can benefit from the present invention is the PEM fuel cell, it will be appreciated by those skilled in the art that the use of other fuel cell configurations is also within the purview of the present invention.

To minimize system redundancy, electricity generated during the operation of the electrochemical conversion assembly can be used to power the compressor or other electricity-consuming components. In another option, the device includes a filter disposed in fluid communication with the oxidant source. Preferably, the filter is disposed within the housing, and may further be placed upstream of the compressor. The chamber may include a low pressure section and a high pressure section. In a more particular option, at least one of the filter, compressor, heat exchanger and water vapor transfer unit is disposed within the low pressure section, while in another, at least one of the filter, compressor, heat exchanger and water vapor transfer unit is disposed within the high pressure section. In still another option, the filter is disposed in the low pressure section and the heat exchanger and water vapor transfer unit are disposed in the high pressure section. The controller may include one or more oxidant parameter measuring elements and a feedback loop in signal communication with the oxidant parameter measuring elements to react to a value sensed by the oxidant parameter measuring element. Examples of appropriate oxidant parameter measuring elements include temperature measuring elements, pressure measuring elements, humidity measuring elements and mass flow measuring elements.

The water vapor transfer unit may include a porous medium made up of numerous microtubes through which water vapor or related humidity-increasing fluids may flow. The porous nature of the microtubes promotes diffusion of moisture from a moisture-bearing fluid (such as the exhaust fluid from a fuel cell cathode) into the oxidant in the chamber to increase the humidity of the supply oxidant being introduced into the electrochemical conversion assembly. Condensate from the saturated exhaust fluid can form on the inner wall of these microtubes, and can subsequently diffuse across the membrane walls of each tube. The heat exchanger is used to reduce the temperature of the oxidant exiting the compressor while increasing the temperature of the exhaust fluid flowing through the porous microtubes. This is beneficial in that the otherwise waste heat produced in the oxidant during its compression can be used to raise the temperature of the water-rich fluid that is passing through the microtubes; by raising the temperature of fluid flowing from the fuel cell exhaust (i.e., stack offgas), the likelihood of water being in a vapor form that can more readily be introduced into the oxidant flowing through the chamber is enhanced, which in turn can be used to increase hydration within parts of the fuel cell that may otherwise dry out during operation. Furthermore, decreased oxidant temperature relative to stack offgas temperature increases the water transfer driving force, and hence efficiency, across the water vapor transfer membrane. Accordingly, during system operation, the heat exchanger can be used to maintain the temperature of the exhaust fluid entering the porous microtubes closer to (although, preferably not in excess of) approximately one hundred degrees Celsius. As is common in heat exchangers, the present heat exchanger may define at least two flowpaths that are in thermal communication with one another. The flowpaths may include a first flowpath configured to be fluidly disposed between the oxidant source and a fuel cell cathode inlet; and a second flowpath configured to be fluidly coupled to a fuel cell cathode outlet. In a more particular embodiment, the water vapor transfer unit and the heat exchanger are fluidly adjacent one another. In addition, the water vapor transfer unit and the heat exchanger can be fluidly coupled to a fuel cell cathode outlet. This is advantageous in that it economizes on space in volume-limited applications, as the heat exchanger and water vapor transfer unit both utilize reactant byproducts from the cathode to manipulate the air yet to be introduced to the cathode as reactant. For example, they can both be fluidly coupled to a fuel cell cathode outlet. At least one baffle may be disposed in the chamber downstream of the compressor. The use of baffles helps to ensure more even distribution of air properties.

Even though the present invention reduces the amount of acoustic noise associated with the manipulation of oxidant to be used in a fuel cell or related electrochemical conversion assembly, there may be situations where additional acoustic attenuation becomes necessary. The device may further include one or more attenuators fluidly coupled to the device to effect noise reduction associated with a flow of oxidant into the oxidant delivery assembly. For example, the attenuators could be fluidly coupled both upstream and downstream of the oxidant delivery assembly to promote an even further reduction in noise. In such a configuration, the attenuators may be mounted to or formed within the housing.

In more particular options, the oxidant delivery assembly and the electrochemical conversion assembly (the latter in the form of a fuel cell) is part of a vehicle such that the fuel cell is a source of motive power. Even more particularly, the vehicle may include a platform configured to carry the source of motive power, a drivetrain rotatably connected to the platform such that the drivetrain is responsive to output from the source of motive power, and numerous wheels connected to the drivetrain.

According to another aspect of the invention, a method of operating a fuel cell system is disclosed. The method includes configuring the fuel cell system to include an air delivery device used to condition the air introduced into a fuel cell, and a controller configured to monitor and selectively vary the extent to which at least one of the components making up the fluid delivery device modifies such air. The air delivery device includes features similar to that of the previously-described aspect. Additionally, the method includes introducing air into the air delivery device, modifying at least one property of the air introduced into the air delivery device and introducing air that has been modified by the air delivery device into the fuel cell.

Optionally, the properties that can be modified by the fuel delivery device include air pressure, air temperature, relative humidity, mass flow or particulate concentration. By way of example, when a compressor (such as previously described) operates on the air, both the temperature and pressure of the air that passes through the chamber defined inside the housing (both similar to that discussed in conjunction with the previous aspect) will be increased. The heat exchanger can be operated to increase the temperature of the exhaust fluid formed during the operation of the fuel cell by absorbing some of the excess heat in the compressed air. The simultaneous increase in exhaust fluid temperature and the decrease in microtube wall temperature (the latter enabled by contact with the lower temperature compressed air that has passed through the heat exchanger) promotes the condensation, subsequent migration and reevaporation of water into a fluid path coupling the air delivery device to the fuel cell, thereby increasing the humidity of supply air entering the fuel cell. Operating the heat exchanger ensures temperatures adequate to increase the amount of vapor present in the moisture-bearing exhaust fluid, thereby improving the humidity in the chamber. With water vapor, increasing the temperature of the exhaust fluid to closer to one hundred degrees Celsius is consistent with such objectives. In addition, a filter may be placed in a flowpath defined in the air delivery to reduce particulate contamination of the air. As with the previous aspect, at least one attenuator can be connected to the air delivery device to reduce the noise associated with the flowing of air into the fluid delivery device.

According to yet another aspect of the present invention, an integrated air delivery device is disclosed. The device, which can be used to modify air for use in a fuel cell system in a manner similar to that of the previously-described aspects, includes a housing that defines an air flowpath with a corresponding chamber, a filter, compressor, heat exchanger and water vapor transfer unit disposed in the flowpath, and a controller configured to monitor and selectively vary the extent of air modification made possible by operation of one or more of the aforementioned components disposed in the air flowpath. The water vapor transfer unit is positioned within the chamber and is configured to transfer water vapor to the pressurized air within the chamber. The compressor is configured to pressurize the chamber with air. The heat exchanger is configured to transfer heat from the pressurized air within the chamber to the water vapor transfer unit.

Optionally, the chamber further can be made up of a first chamber defining a low pressure region and a second chamber defining a high pressure region. In one form, the filter is disposed in the first chamber. In a more particular form, it is disposed in the first chamber upstream of the compressor. The water vapor transfer unit and the heat exchanger are preferably disposed in the second chamber. In a preferred embodiment, the reactant byproduct (exhaust fluid) that comes in thermal contact with the heat exchanger are then passed though the inner portion of the microtubes. During operation of the system, the heat exchanger is used to increase the efficiency of the water vapor transfer unit. In a preferred embodiment, the temperature of the reactant byproduct after passing through the heat exchanger is enough to ensure a strong vapor presence, thereby promoting a significant vapor phase with concomitant increase in diffusion through the previously-discussed microtubes. For example, in the case of an exhaust fluid with a significant water content, this temperature would be close to one hundred degrees Celsius for a normal atmospheric pressure (possibly even higher in situations where the air pressure is elevated, as long as microtube durability is not compromised). In a particular option, electricity generated during the operation of the fuel cell can be used to provide power to run the compressor.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 3A shows an elevation cutaway view of an integrated air delivery system according to an aspect of the present invention;

DETAILED DESCRIPTION OF THE PREFERRED EMBODIMENTS

Figure 1:
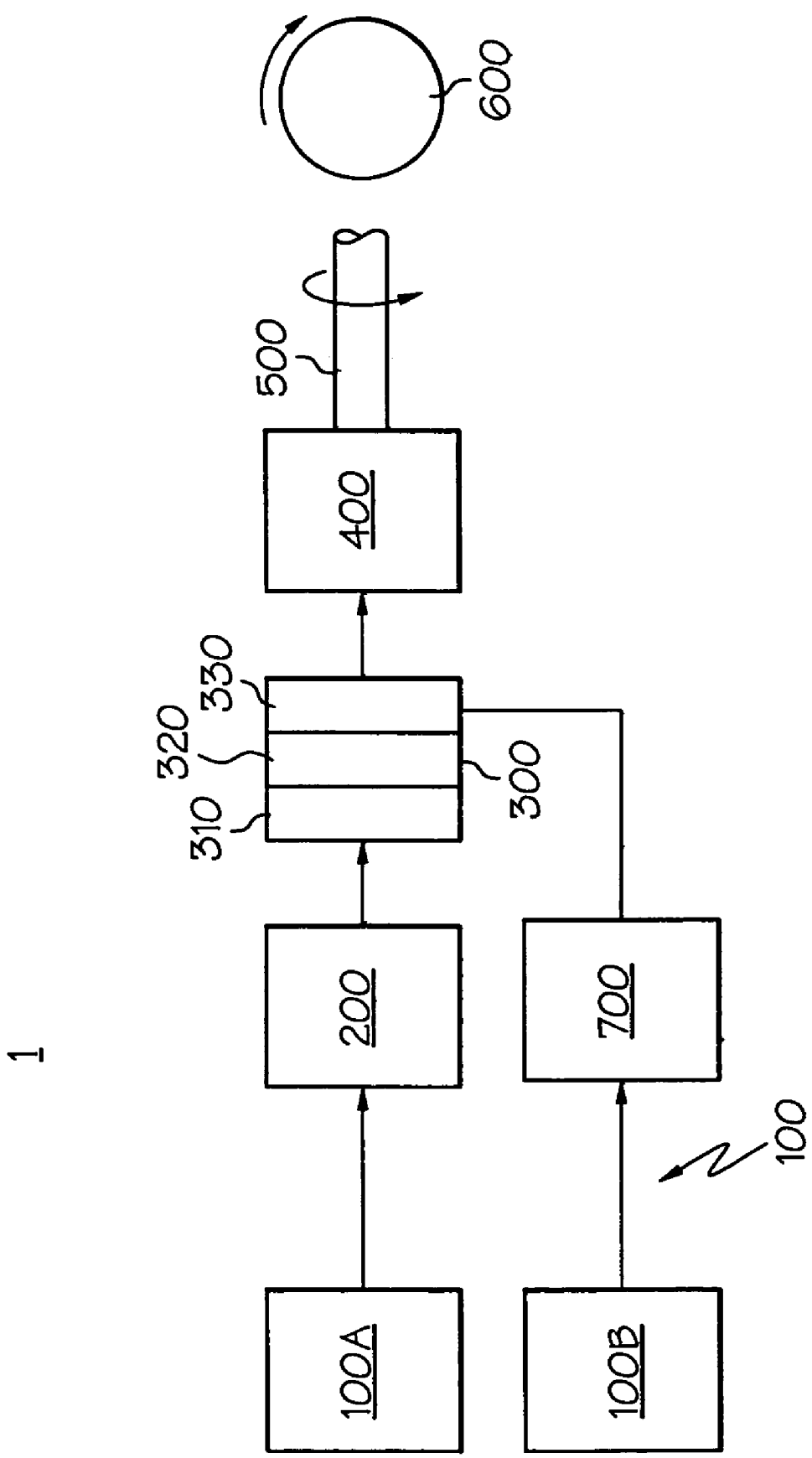
FIG. 1 shows a block diagram of a fuel cell system configured for vehicular application.
Figure 4:
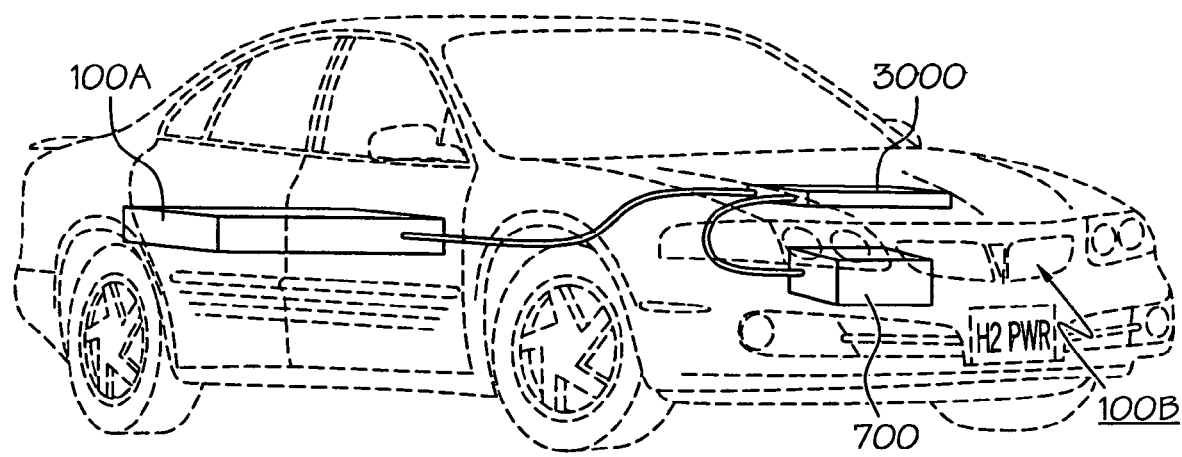
FIG. 4 shows a vehicle employing the fuel cell system of FIG. 3A.

Referring initially to FIGS. 1 and 4, a block diagram highlights the major components of a mobile fuel cell system 1 according to the present invention, as well as a representative placement of a fuel cell system into an automotive application. Referring with particularity to FIG. 1, the system 1 includes a fuel delivery system 100 (made up of fuel source 100A and oxygen source 100B), fuel processing system 200, fuel cell 300, one or more energy storage devices 400, a drivetrain 500 and one or more motive devices 600, shown notionally as a wheel. While the present system 1 is shown for mobile (such as vehicular) applications, it will be appreciated by those skilled in the art that the use of the fuel cell 300 and its ancillary equipment is equally applicable to stationary applications. It will also be appreciated by those skilled in the art that other fuel delivery and fuel processing systems are available. For example, there could be, in addition to a fuel source 100A and oxygen source 100B, a water source (not shown). Likewise, in some variants where substantially purified fuel is already available, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. Fuel cell 300 includes an anode 310, cathode 330, and an electrolyte layer 320 disposed between anode 310 and cathode 330. Although only a single fuel cell 300 is shown in FIG. 1, it will be appreciated by those skilled in the art that fuel cell system 1 (especially those for vehicular and related applications) may be made from a stack 3000 (shown in FIG. 4) of such cells serially connected. An air delivery system 700 is shown between the oxygen source 100B and the cathode 330 of fuel cell 300 and, as described below, is used to manipulate one or more properties of the incoming air from oxygen source 100B.

Figure 2:
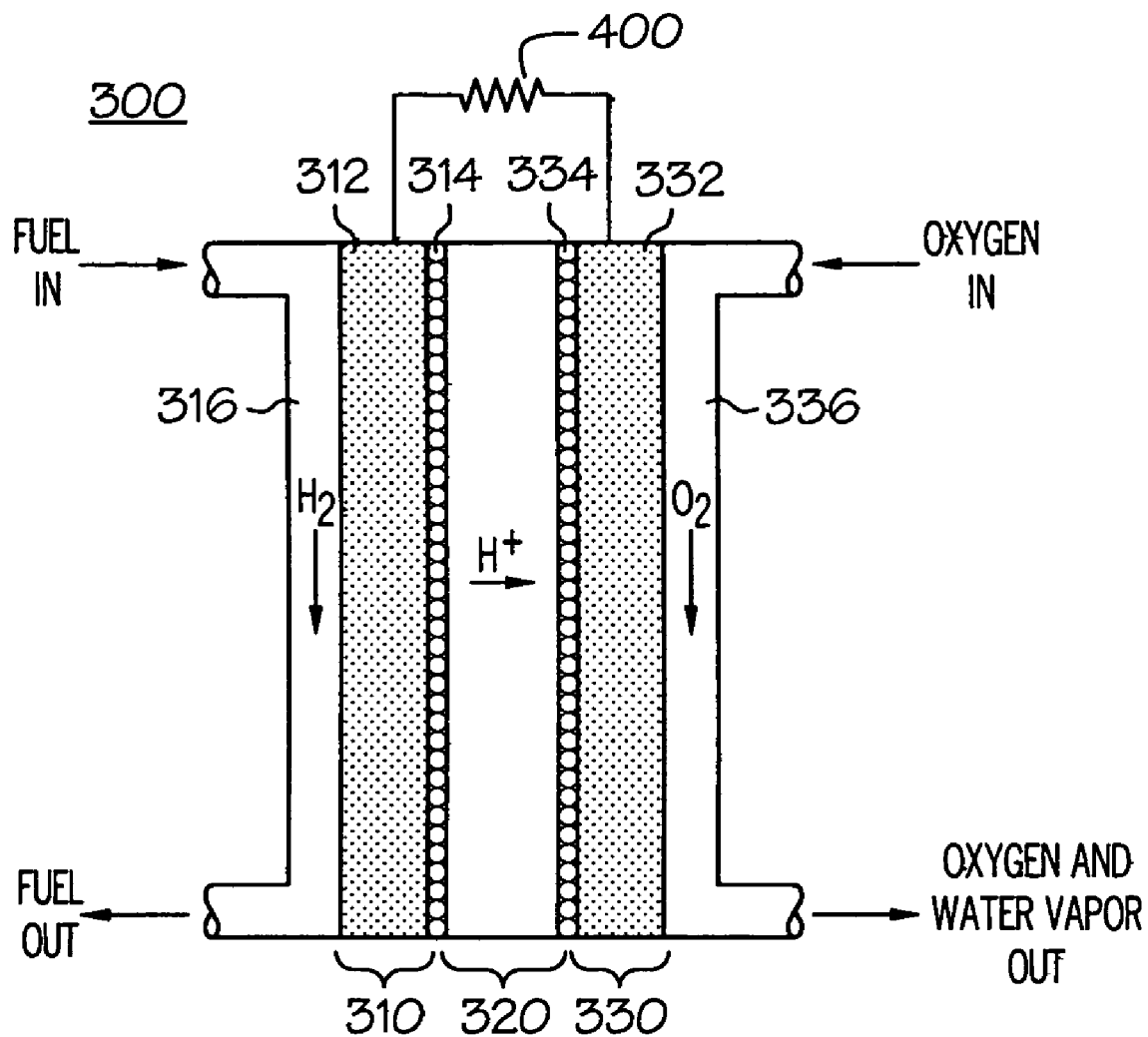
FIG. 2 shows a notional fuel cell from the system of FIG. 1.

Referring next to FIG. 2, the anode 310 includes an electrode substrate 312 and catalyst layer 314 connected to a flow channel 316. The cathode 330 includes an electrode substrate 332 and catalyst layer 334 connected to a flow channel 336. Flow channels 316, 336 form the part of an anode flowpath and cathode flowpath that act as conduit for delivering reactants to their respective anode and cathode. In a preferred (but not necessarily exclusive) embodiment, the reactant being routed through flow channel 316 is hydrogen, while that being routed through flow channel 336 is air or related oxygen-rich fluid. It is qualities of that air, including at least pressure, temperature, mass flow and relative humidity, that the present invention is configured to manipulate in order to optimize performance of fuel cell 300. Preferably, the electrode substrates 312, 332 are porous to allow diffusion of fuel and oxygen, as well as the flow of water that forms as a result of the fuel-oxygen reaction. The catalyst layer 314 is made up of a catalyst (not shown) dispersed on the surface of a support (not shown). The electrolyte layer 320, shown presently in the form of a proton exchange membrane, is placed between each of the anode 310 and cathode 330 to allow the ionized hydrogen to flow from the anode 310 to the cathode 330 while inhibiting the passage of electrical current therethrough. Fuel (typically in the form of gaseous hydrogen) passes through flow channel 316, allowing the fuel to diffuse through electrode substrate 312 and come in contact with the catalyst, through which the electrochemical oxidation of the hydrogen fuel proceeds by what is believed to be a dissociate adsorption reaction. This reaction is facilitated by the catalyst, typically in the form of finely-divided particles of a noble metal (such as platinum) that are dispersed over the surface of the support, which is typically carbon-based. The positively-charged hydrogen ion (proton) produced at the anode 310 then passes through the electrolyte 320 to react with the negatively-charged oxygen ions generated at the cathode 330. The flow of liberated electrons sets up a current through the load 400 such that a motor or related current-responsive device may be turned. Load 400, shown in the form of the previously-discussed energy storage device, completes an electrical flowpath between the anode and cathode of fuel cell 300. An additional pump (not shown) can be included to remove from the electrode substrates 312, 332 water that would otherwise collect and possibly block the porous passageways.

Figure 3B:
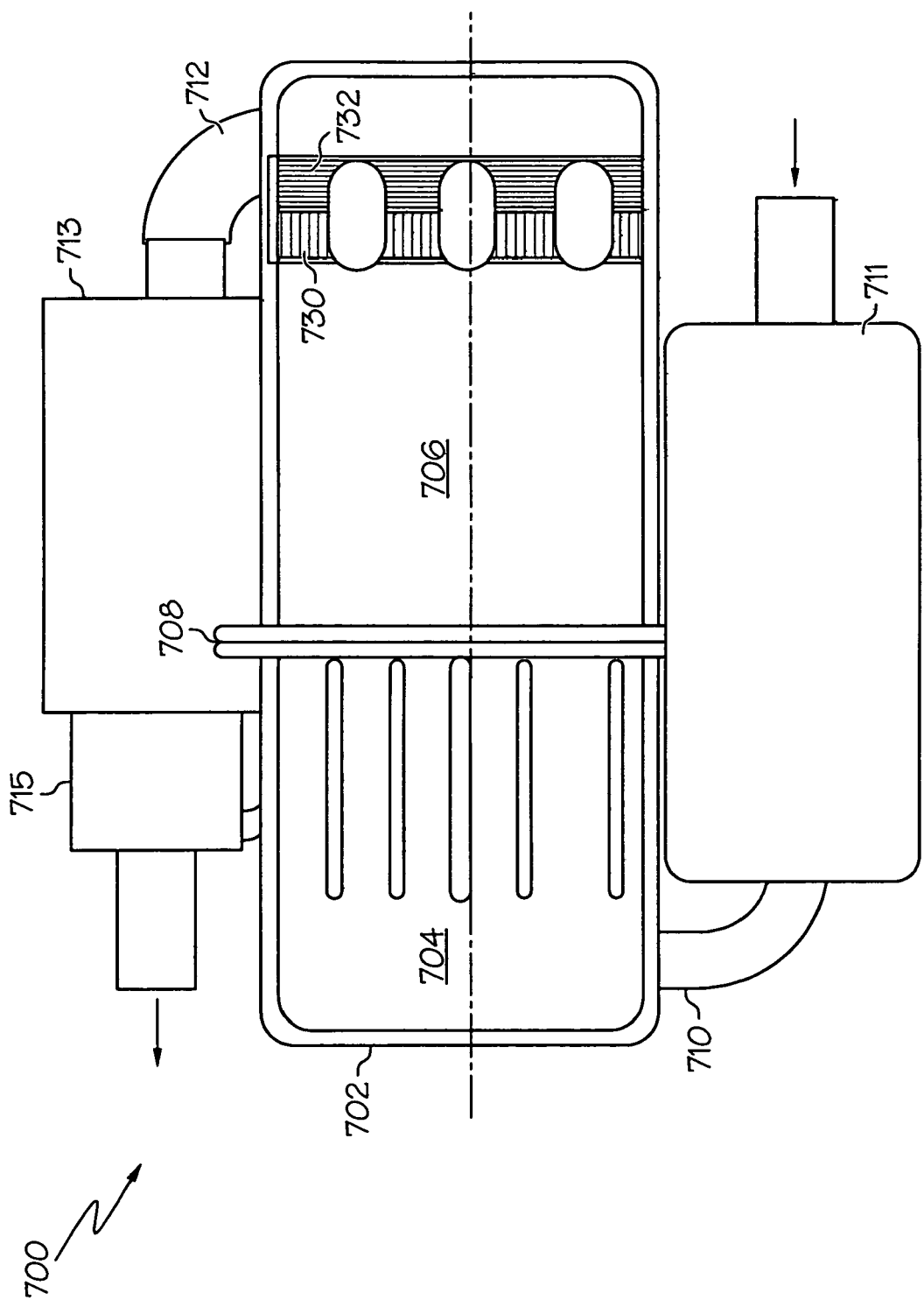
FIG. 3B shows a top view of the system of FIG. 3A, and including optional attenuators.

Referring next to FIGS. 3A through 3D, details of the air delivery system 700 according to an embodiment of the invention are shown. Referring with particularity to FIG. 3A, a block diagram of the primary components within the present system 700 shows the system including housing 702 with a chamber 705, an inlet air filter 714, compressor 722, heat exchanger 730 and water vapor transfer unit 732. Compressor 722, which is preferably in the form of a screw compressor to reduce the pulsing associated with other positive-displacement compressors, can be powered by a compressor motor 716. As shown by the figures, the substantial enclosure of many of the system's components evidences a compact design configured to minimize its contribution to overall fuel cell system size, weight and complexity. In addition, system reliability is enhanced as functions are combined, resulting in fewer interfaces, parts and the like. The chamber 705 of system 700 is divided into a low pressure chamber 704 and a high pressure chamber 706. The low pressure chamber 704 contains the inlet air filter 714, compressor motor 716 and air mass flow meter 718. An air flowpath through the system 700 is designated by arrows, where the air enters through an inlet 710 and exits through an outlet 712. The chamber 705 offers improved pressure difference reduction by employing a hollow chamber rather than numerous separate conduits. In addition, the design of the chamber 705 is such that it attenuates acoustical noise generated by the incoming and compressed air. In situations where noise minimization requirements are particularly stringent, the optional attenuators 711 and 713 shown in FIG. 3B can be used to further reduce noise. They are coupled to the respective inlet 710 and outlet 712. An optional discharge air cooler can be placed downstream of outlet attenuator 713 for additional cooling of the air being delivered to the fuel cell 300. The separator has the effect of providing significant pressure isolation between the two portions of chamber 705. As such, filtered air traverses the flowpath and enters the compressor 722 that is sealed from the motor 716 and the low pressure chamber 704 by the separator 708. In addition, a seal 720 is used to separate the motor 716 from the compressor 722. Sensor 726 is mounted in housing 702, and can be used to measure oxidant parameters. In particular form, sensor can be used to measure temperature, pressure and humidity in a manner generally similar to the air mass flow meter 718.

Compressor 722, heat exchanger 730 and water vapor transfer unit 732 are disposed within the high pressure chamber 706. The air exhaust port 724 of compressor 722 opens directly into the high pressure chamber 706 where baffles 728 can be used to promote air swirling. In addition to promoting the formation of a more homogeneous mixture through swirling, baffles 728 can also reduce noise. Air generated by compressor 722 enters the high pressure chamber 706 at elevated temperature (between, for example 120 and 140 degrees Celsius) as a result of the compression. The system 700 humidifies and cools the air to levels required by the fuel cell 300 by passing the compressed, swirled and hot air through the heat exchanger 730 and water vapor transfer unit 732, the latter functioning as a humidity control device. Significant factors that effect the water transfer driving force include the humidity difference between the cathode exhaust fluid that enters the cathode recuperator inlet 734 (which may be, for example, approximately 80 percent relative humidity) and the compressed air passing through high pressure chamber 706 (which may be, for example, approximately 55 percent after humidification), and the temperature difference between the cathode exhaust fluid (which may be, for example, approximately 70 to 80 degrees Celsius) and the compressed air (which may be, for example, approximately seventy degrees Celsius). Regarding the first factor, the higher the difference, the more water that can be transferred by the membranes of the microtubes 732B. Regarding the second factor, the higher the difference, the more water that can be condensed on the walls of the microtubes 732B and consequently transferred to the compressed air. As such, the higher the compressed air temperature is going into the water vapor transfer 732 unit, the lower the amount of humidification possible.

Moist air from the cathode exhaust of the fuel cell 300 enters the heat exchanger 730 via cathode recuperator inlet 734, exiting through a water vapor transfer unit manifold 736 and cathode recuperator outlet 738. The cathode recuperator inlet 734 contains significant amount of water at fuel cell stack exhaust temperature (approximately 80 to 85 degrees Celsius). The cathode heat exchanger 730 accomplishes dual functions by raising the temperature of the exhaust fluid flowing through cathode recuperator inlet 734 by transferring to the fluid energy from the compressed air flowing through the high pressure chamber 706 using heat exchanger 730. This action allows more efficient water vapor transfer to the compressed air in the water vapor transfer unit 732. An additional gain in transferring water from the exhaust fluid into the fuel stack inlet (i.e., reactant supply) air is achieved by exposing the exhaust fluid in the water vapor transfer unit 732 to elevated temperatures to promote a vapor phase (and concomitant higher humidity) within the exhaust fluid, as well as a temperature difference driving force between the exhaust fluid and the reactant supply air.

Figure 3C:
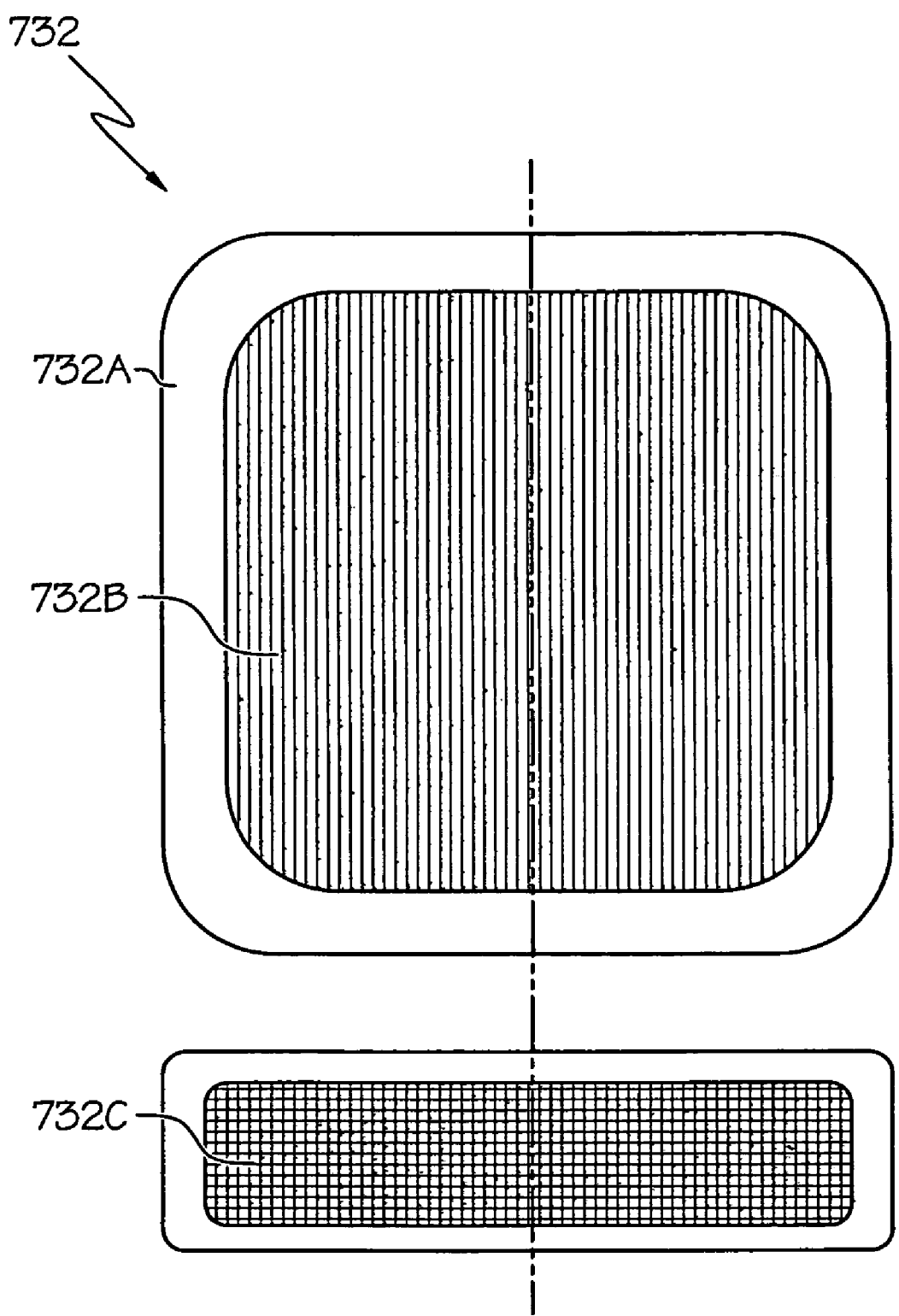
FIG. 3C shows a view of a water vapor transfer unit for the system of FIG. 3A.

Referring with particularity to FIG. 3C, the mechanism of transferring water into the compressed air designated for the fuel cell 300 is shown in more detail. Water vapor transfer unit 732 includes a case 732A that holds a plurality of porous microtubes 732B (an example of which is manufactured by NOK Corp. of Japan) that can transfer liquid water through their walls into surrounding air. The cathode exhaust fluid that is routed through the cathode recuperator inlet 734 is saturated with water vapor. When the temperature of the exhaust fluid is considerably greater than the temperature of the air leaving the compressor 722 and passing through the high pressure chamber 706, the water vapor present in the exhaust fluid tends to condense on the wall of the microtube 732B. The condensate then passes through inner diameter of the microtubes 732B through sealing interface 732C that forms a part of case 732A. The humidification performance of the water vapor transfer unit 732 is improved by inducing condensation in the cathode exhaust fluid. This can occur under conditions where the temperature of the air exiting compressor 722 and before being routed to the fuel cell 300 is less than the temperature of the cathode exhaust fluid that is routed through the cathode recuperator inlet 734. When such is true, the temperature of the microtubes 732B is decreased to the point where liquid water present in the exhaust fluid will start to form on the surface of the tubes. The water is then transported through the porous membrane and is subsequently evaporated at the drier side of the membrane. As far as pressure differentials are concerned, the relatively high pressures inside the high pressure chamber 706 of housing 702 should not inhibit the passage of the water vapor from inside the microtubes 732B to the air flowpath inside high pressure chamber 706, as the ability to function in a reverse osmosis-like fashion depends from (among other things) the flow velocity. Similarly, the mix of water vapor and pressurized air passing through high pressure chamber 706 is made more homogeneous due to the swirling motions created by baffles 728. An additional benefit of transferring the heat generated by the compression of the air to the water vapor transfer unit 732 is that the air temperature coming out of the heat exchanger 730 has potential to meet temperature requirements of fuel cell 300 as a result of energy consumption from the compressed air by cathode heat exchanger 730. In other words, the cooperation of the heat exchanger 730 and water vapor transfer unit 732 (and an optional discharge air cooler 715) lower the compressed air temperature from initial values of between 120 to 140 degrees Celsius before combination to between approximately 60 and 85 degrees Celsius thereafter.

Figure 3D:
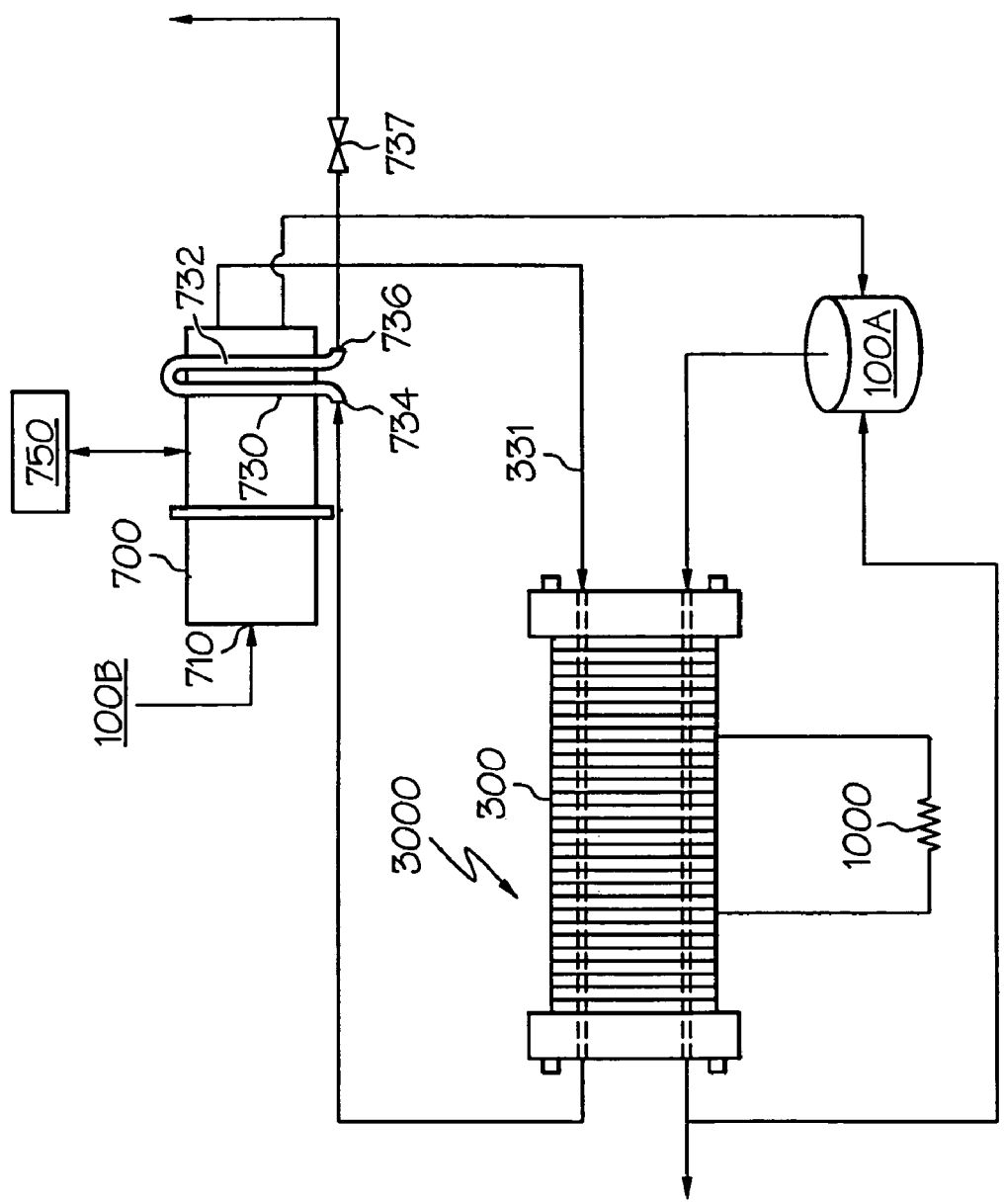
FIG. 3D shows a simplified flow diagram of a fuel cell system employing the integrated air delivery system of FIG. 3A.

Referring next with particularity to FIG. 3D, a block diagram showing the fluid connections between the integrated air delivery system 700 and a fuel cell stack 3000 is shown. As previously mentioned, the incoming air from air source 100B can have one or more of its temperature, pressure, humidity and mass flow properties be manipulated. Traditionally, the biggest contributor to parasitic loss is the pressure loss associated with the incoming air. For example, the incoming air that passes through the filter 714 (shown in FIG. 3A) incurs a pressure drop. In situations where the fuel cell needs high pressure oxidants and reductants, the air pressure may need to be between 1.2 and 2.2 times the atmospheric pressure. To optimize system performance, it is desirable to reduce these parasitic losses. Cathode flowpath 331 promotes the flow of air from air source 100B from the air delivery system 700, through the fuel cell stack 3000 and back to the heat exchanger 730 and water vapor transfer unit 732 via inlet 734 and to a vent via outlet 736. In addition, a back pressure valve 737 is included downstream of outlet 736 to maintain a high pressure on the fuel cell stack 3000. This ensures that the pressure drop of the air between the air exhaust port 724 of compressor 722, the individual fuel cells 300 and the remainder of the devices in the cathode flowpath 331 remains relatively small (on the order of 10 to 15 kPa, or about 1.5 to 2.2 pounds per square inch). Electricity generated in fuel cell stack 3000 can be used to power a load 1000, such as an automobile or related vehicle drivetrain.

As shown, a comparable fuel flowpath is configured to route fuel from a fuel source 10A, through the anodes of the fuel cell stack 3000, and out, where a recycle line can be used to capture unused fuel. Controller 750 is used to determine which components of air delivery system 700 should be operating to manipulate the air coming from air source 100B. Numerous air parameter measuring elements (such as air mass flow meter 718 shown) can be used to provide signals to controller 750. The controller 750 includes a feedback loop in signal communication with the air parameter measuring elements to react to a value sensed thereby. In addition to the air mass flow measuring meter 718, previously discussed examples of appropriate air parameter measuring elements include temperature measuring elements, pressure measuring elements and humidity measuring elements.

Benefits realized by using the present invention include minimum presence of liquid water in the air exiting the air delivery system, since the vaporization process effected by the combined operation of the water vapor transfer unit and the heat exchanger promotes the formation of vapor. In addition, the baffles help to promote a homogeneous mixture of compressed air and water vapor due to the swirling actions generated. Moreover, the microtubes 732B of the water vapor transfer unit 732 function as a filter device (similar to inlet air filter 714), thereby removing the need for an output air filter. In addition to reducing system complexity, the elimination of an extra pressure-reduction device promotes the higher reactant pressures sometimes needed in fuel cell applications. In addition, the present design can accommodate different types of compressors with minimum adjustments.

While certain representative embodiments and details have been shown for purposes of illustrating the invention, it will be apparent to those skilled in the art that various changes may be made without departing from the scope of the invention, which is defined in the appended claims.

What is claimed is:

1. A device comprising:
   a proton exchange membrane fuel cell configured to combine an oxidant and a reductant;
   an oxidant delivery assembly fluidly coupled to said fuel cell, said oxidant delivery assembly configured to manipulate at least one property of oxidant delivered from an oxidant source and prior to use thereof in said fuel cell, said oxidant delivery assembly comprising:
   a compressor;
   a heat exchanger;
   a water vapor transfer unit fluidly coupled to said heat exchanger to define a sequential flowpath therethrough; and a housing defining a chamber therein such that said compressor, heat exchanger and water vapor transfer unit are substantially positioned in said chamber to define an integrated unit thereby, wherein said compressor is configured to pressurize at least a portion of a hollow space defined within said chamber with oxidant from said oxidant source, said heat exchanger is configured to transfer heat from oxidant within said chamber to an exhaust fluid produced by said fuel cell, and said water vapor transfer unit is configured to transfer water vapor from said exhaust fluid to said oxidant in said chamber; and a controller configured to monitor and selectively vary the extent to which said oxidant delivery assembly modifies the oxidant.

2. The device of claim 1, further comprising a filter disposed in fluid communication with said compressor.

3. The device of claim 2, wherein said filter is fluidly disposed between said oxidant source and said compressor.

4. The device of claim 2, wherein said filter is disposed within said housing.

5. The device of claim 4, wherein said chamber comprises a low pressure section and a high pressure section.

6. The device of claim 5, wherein at least one of said filter, compressor, heat exchanger and water vapor transfer unit is disposed within said low pressure section.

7. The device of claim 5, wherein at least one of said filter, compressor, heat exchanger and water vapor transfer unit is disposed within said high pressure section.

8. The device of claim 5, wherein said filter is disposed in said low pressure section and said heat exchanger and water vapor transfer unit are disposed in said high pressure section.

9. The device of claim 1, wherein said controller comprises at least one oxidant parameter measuring element and a feedback loop disposed in signal communication with a value sensed by said oxidant parameter measuring element.

10. The device of claim 9, wherein said oxidant parameter measuring element is selected from the group consisting of temperature measuring elements, pressure measuring elements, humidity measuring elements and mass flow measuring elements.

11. The device of claim 1, wherein said water vapor transfer unit comprises a plurality of porous microtubes configured to be disposed in fluid communication with said electrochemical conversion assembly such that at least a portion of an exhaust fluid flowing from said fuel cell and through said porous microtubes can diffuse through the latter and into said oxidant in said chamber to increase the humidity of said oxidant.

12. The device of claim 11, wherein said heat exchanger is configured to reduce the temperature of said oxidant exiting said compressor while increasing the temperature of said exhaust fluid entering said porous microtubes.

13. The device of claim 12, wherein during operation of said device, said heat exchanger maintains said exhaust fluid entering said porous microtubes at a temperature of at least one hundred degrees Celsius.

14. The device of claim 12, wherein said oxidant delivery assembly and said fuel cell is part of a vehicle such that said fuel cell is a source of motive power.

15. The device of claim 14, wherein said vehicle comprises:

a platform configured to carry said source of motive power;

a drivetrain rotatably responsive to output from said source of motive power, said drivetrain connected to said platform; and a plurality of wheels connected to said drivetrain.

16. The device of claim 1, wherein said heat exchanger comprises a plurality of flowpaths disposed therein that are in thermal communication with one another, said plurality of flowpaths comprising:

a first flowpath configured to be fluidly disposed between said oxidant source and a fuel cell cathode inlet; and a second flowpath configured to be fluidly coupled to a fuel cell cathode outlet.

17. The device of claim 1, wherein said water vapor transfer unit and said heat exchanger are fluidly adjacent one another.

18. The device of claim 17, wherein said water vapor transfer unit and said heat exchanger are configured to be fluidly coupled to a fuel cell cathode outlet.

19. The device of claim 1, further comprising at least one baffle disposed in said chamber downstream of said compressor.

20. The device of claim 1, further comprising an attenuator fluidly coupled to said device to effect noise reduction associated with a flow of fluid from said fluid source.

21. The device of claim 1, wherein electricity generated during the operation of said fuel cell can power said compressor.

* * * * *